United States Patent
Karem

(10) Patent No.: US 8,276,840 B2
(45) Date of Patent: Oct. 2, 2012

(54) FAIL-OPERATIONAL MULTIPLE LIFTING-ROTOR AIRCRAFT

(76) Inventor: Abe Karem, Tustin, CA (US)

( * ) Notice: Subject to any disclaimer, the term of this patent is extended or adjusted under 35 U.S.C. 154(b) by 30 days.

(21) Appl. No.: 12/944,611

(22) Filed: Nov. 11, 2010

(65) Prior Publication Data

US 2011/0114797 A1    May 19, 2011

Related U.S. Application Data

(62) Division of application No. 11/506,044, filed on Aug. 16, 2006, now abandoned.

(60) Provisional application No. 60/713,683, filed on Sep. 2, 2005.

(51) Int. Cl.
*B64D 35/04* (2006.01)
*B64D 35/08* (2006.01)
*B64C 27/26* (2006.01)
*B64C 27/28* (2006.01)

(52) U.S. Cl. ......... 244/60; 244/7 C; 244/12.4; 244/17.23

(58) Field of Classification Search ............. 244/6, 7 R, 244/7 C, 12.4, 17.19, 17.23, 60, 194
See application file for complete search history.

(56) References Cited

U.S. PATENT DOCUMENTS

| | | | |
|---|---|---|---|
| 2,330,842 A | 10/1943 | Pullin | |
| 2,981,069 A * | 4/1961 | Lear | 244/60 |
| 3,073,547 A | 1/1963 | Fischer | |
| 3,106,369 A | 10/1963 | Borst | |
| 3,136,499 A | 6/1964 | Kessler | |
| 4,142,697 A | 3/1979 | Fradenburgh | |
| 4,691,877 A | 9/1987 | Denning | |
| 5,054,716 A | 10/1991 | Wilson | |
| 5,823,470 A | 10/1998 | Craig et al. | |
| 6,030,177 A | 2/2000 | Hager | |
| 6,592,071 B2 * | 7/2003 | Kinkead et al. | 244/7 R |
| 6,793,173 B2 | 9/2004 | Salesse-Lavergne | |
| 6,848,649 B2 | 2/2005 | Churchman | |
| 2010/0276549 A1 * | 11/2010 | Karem | 244/7 A |

\* cited by examiner

*Primary Examiner* — Joseph W Sanderson

(74) *Attorney, Agent, or Firm* — Fish & Associates, PC

(57) ABSTRACT

A rotorcraft having multiple rotors, and wings that provide lift in forward flight, has a mechanical coupling between rotors that can be disengaged and optionally reengaged, during flight. The coupling, which can prevent a failure of one rotor from interfering with rotation of the other rotor(s), can be accomplished using many different types of devices, including for example, dog clutches, friction clutches, and collapsible clutches. Disengagement can range from being completely under control of an operator, to partially under operator control, to completely automatic. Among many other benefits, designing, manufacturing, fitting, retrofitting or in some other manner providing an aircraft with a device that can disengage rotation of one of the rotors from that of another one of the rotors during flight can be used to improve survivability in an emergency situation.

10 Claims, 3 Drawing Sheets

FAIL-OPERATIONAL MULTIPLE LIFTING-ROTOR AIRCRAFT

This application is a divisional of U.S. application Ser. No. 11/506,044 filed Aug. 16, 2006 which is claims priority to U.S. Provisional Application Ser. No. 60/713,683 filed Sep. 2, 2005 each of which is incorporated by reference herein in its entirety.

TECHNICAL FIELD

The field of the invention is multiple lifting-rotor aircraft.

BACKGROUND

Any rotor system, its mounting or controls, or the drive connection including shafting and direction-changing gearboxes can suffer from impending or catastrophic failure. The failure cause can be internal, typically a component failure, or external by the sustaining of battle damage. In any event, the method of monitoring the loads, vibrations, temperatures and rotational speeds will determine whether the failure is progressive or instantaneous, and whether the drive disconnection should be elective or automatic.

When in forward flight, the likelihood of secondary damage to an aircraft structure due to severe vibration from, for example, the loss of a rotor blade must be minimized. Aircraft with multiple lifting-rotors always have a mechanical linkage between the rotors to prevent lift imbalance should one rotor fail to rotate. The problem with that arrangement, however, is that the safety benefit in vertical flight becomes a liability in forward, wing-borne flight.

Until very recently, the range/payload capability of a tilt-rotor or compound aircraft was so limited that attention was not focused on this problem. More recently, a combination of gains in aircraft structural material strength, aerodynamic and dynamic improvements in rotors and in the fuel efficiency of gas turbine engines has resulted in a substantial improvement in VTOL aircraft utility. As the utility improves, and as the scale and payload capability of VTOL aircraft enlarges, (i.e. a decrease in the operating cost per ton-mile), it is clear that tilt-rotor aircraft can become part of a short to mid-range transportation system for passengers and freight. Increased attention to the tilt-rotor aircraft type is based on its potential for reducing airport congestion and at the same time achieving turbo-prop speed and fuel efficiency over ranges of several hundreds of miles. The vertical take off and conversion phase of a typical flight could now occupy only about one percent of total flight time. Given the mechanical complexity of tilt-rotor aircraft, and the new reality that they are cruise flight rather than hovering machines, a fresh appraisal of the flight safety implications of the engines/rotors/drive systems and their fail-operational behavior is needed. This is the subject and scope of the described invention.

In addition, during the last six decades of incremental helicopter development, design attention was always paid to their flight safety as rotor-borne lifting machines, whether for emergency rescue, the lifting of loads, or for military excursions. A prime objective was to minimize the effect of power loss leading to the use of two or more engines, and to the permanent shaft connection between the two rotors of a tilt rotor, or the two rotors of a tandem rotor, so that there was no sudden lateral or longitudinal lift imbalance in the event of one engine failing.

Most tilt-rotor, tilt-wing aircraft and multi lifting rotors compound helicopter designs rely on cross shafts between their 2 or 4 rotors to provide hover lift from all rotors when an engine fails. These cross shafts, in current design practice, are permanently engaged in flight such that all rotors turn if any engine is operational. Automatic disengagement of non operational engines is provided by the use of one-way clutches (Sprag-type clutches in most cases).

Propeller-driven passenger aircraft, either the piston engine powered examples of the 1920-60 era or the modern turboprop powered aircraft, don't hover or VTOL and therefore use no cross shaft. They are capable of safe flight and landing in the case of an engine failure or the mechanical or structural failure of a propeller. In such cases the propeller is stopped and the blades controlled to a streamline position ("feathered" in the aircraft vernacular).

During hover and conversion to forward flight, all known tilt-rotor and tilt-wing aircraft cannot continue flight to a safe landing when a rotor (not an engine) fails. However, as previously noted, these two flight regimes occupy a small and decreasing percentage of the total flight time as the utility of the aircraft improves and it becomes predominantly a transportation machine and not a lifting device. In order to render tilt-rotor and tilt-wing aircraft acceptable for large scale transportation of passengers, it must be possible to continue wing-borne flight, in airplane mode, to a safe landing with a damaged or disabled rotor, and not to allow this single point failure to unduly compromise flight safety.

Thus, there is still a need for methods and apparatus in which a failure of one rotor in a multiple lifting-rotor aircraft not interfere with rotation of the other rotor(s).

SUMMARY OF THE INVENTION

The current invention provides methods and apparatus in which a rotorcraft having a mechanical coupling between rotors can be disengaged and optionally reengaged, during flight, and thereby prevent a failure of one rotor from interfering with rotation of the other rotor(s). This can be accomplished using many different types of devices, including for example, dog clutches, friction clutches, and collapsible clutches.

In preferred embodiments the rotorcraft is either a tilt-rotor rotorcraft or a tilt wing rotorcraft. In the latter case the tilting wing may be only that portion of the wing that is outboard of the nacelle. In other embodiments the rotorcraft may have a forward thrust device other than the rotors, and the rotorcraft can include a technology that provides for automatic conversion to wing-borne flight.

Disengagement can range from being completely under control of an operator, to partially under operator control, to completely automatic. In yet another aspect, it is contemplated that the mechanical coupling between rotors can be reengaged during flight.

Among many other benefits, designing, manufacturing, fitting, retrofitting or in some other manner providing an aircraft with a device that can disengage rotation of one of the rotors from that of another one of the rotors during flight can be used to improve survivability in an emergency situation.

Various objects, features, aspects and advantages of the inventive subject matter will become more apparent from the following detailed description of preferred embodiments of the invention, along with the accompanying drawings in which like numerals represent like components.

DETAILED DESCRIPTION

Figure 1:
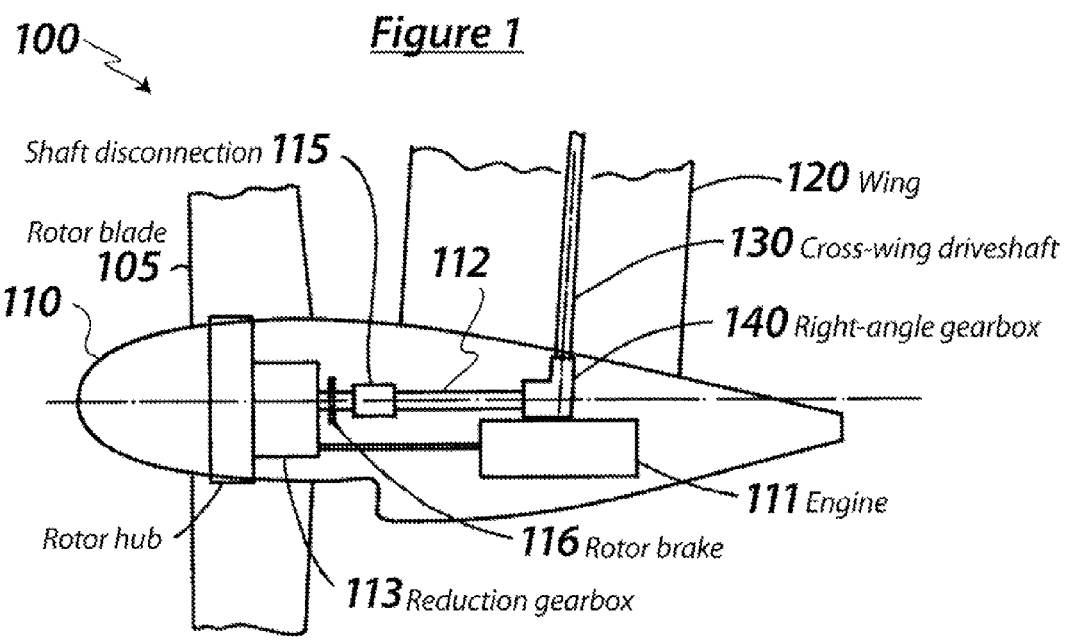
FIG. 1 is a schematic in plan view of basic elements of a nacelle of tilt rotor aircraft according to aspects of the present invention.

Matrix of Flight Condition, Failure Type, and Corrective Action

The following table, Table 1, is a matrix of prevailing flight conditions, failure type, the shaft disconnection decision and the resulting flight safety enhancement applicable to a two-rotor tilt rotor. This is an illustrative example, and the same logic would be applied to the drive arrangements and disconnection provisions for other aircraft configurations with different drive arrangements.

TABLE 1

| Flight regime | Failure type | Shaft disconnection | Rotor brake activated | Result of action |
|---|---|---|---|---|
| VTOL (1) | Loss of one engine | No | No | Power loss but no lift imbalance |
| VTOL (2) | Loss of one rotor, rotor control or rotor gear box | N/A | N/A | Possibly Catastrophic (depends on possible shaft disconnect and transition to forward flight) |
| VTOL (3) | Failed cross-wing driveshaft or related right angle gearboxes | Yes | No | No impact apart from lack of power plant redundancy |
| Airplane Mode (4) | Loss of one engine | No | No | Power loss but no thrust imbalance |
| Airplane Mode (5) | Loss of one rotor, rotor control or rotor gear box | Yes | Yes for disabled rotor | Continue single-engined flight with yaw control from rudder trim or rotor cyclic. Runway/prepared surface landing mandated |
| Airplane Mode (6) | Loss of cross-wing driveshaft or right-angle drive gearbox(es) | Yes | No | No impact except no symmetrical thrust available if operating single-engined. |
| Airplane Mode, revert to VTOL (7) | Rotor damaged but VTOL-functional, short-term vibration permitted | Yes, followed by voluntary shaft re-engagement | Yes, followed by voluntary de-activation | Continue single-engined flight (yaw-controlled) followed by VTOL landing |

The above table shows that four (possibly five) out of the seven failure possibilities could result in flight continuation to a safe landing if the shaft disconnection system was implemented. Whilst the failures of cases 1 to 7 are not necessarily equal in their probability, it is clear that there are important safety benefits to be gained from shaft disconnection, and that this is an innovative and necessary feature for future tilt rotor developments.

Method of Implementing Shaft Disconnection/Re-Connection

The system elements required for a shaft disconnection arrangement consist of the de-coupling devices, the actuators (most likely electric actuators) for providing the de-coupling action, a comprehensive sensor set, a computer-based data assessment and decision/display/response system and a brake or retarding device for the uncoupled parts of the rotor system. The system can be completely automatic, completely manual, or anything in between.

Information System: A sensor set consisting of an array of sensors is critically located at multiple points on the drive system, for example, at shaft bearings, gearboxes, rotor hubs and blade attachments. As is presently implemented in multi-channel data collection and monitoring systems, the parameters to be measured could include rotational speed, torque, temperature, vibration and noise.

Failure Detection: Sensor outputs are compared to threshold values. Deviations past threshold values can be either gradual (a trend) or instantaneous (indicative of a catastrophic failure).

Response Possibilities Resulting From Failure Detection: Automatic or autonomous control strategies allow for a range of responses to failure detection and for operator intervention or non-intervention. Four of many possibilities are presented:

1) Instantaneous reaction to failure, shaft disconnection with no operator input.
2) Time-delayed shaft disconnection, automatic function unless over-ridden by operator.
3) Operator-elected shaft disconnection decision, to proceed/not proceed dependent on situation requirements and data indications.
4) Operator-elected shaft re-connection, necessary because of required VL (Vertical Landing).

Coupling Hardware Required For Disconnection. A detailed description of the construction features of a separable-under-load, actuator-operated coupling is not included, as the specifics of the coupling do not affect its location in the drive system, the implementation of the control or the resulting safety enhancement. However, the weight of a coupling that only separates the drive with no possibility of re-connection under load is not a significant factor in the overall drive system weight.

Coupling Hardware, Disconnection Followed By Re-connection Under Load. The short-term re-instatement of a damaged but still-functional rotor so as to make an emergency but successful VTOL landing will require the re-connection of the drive when substantial torque is present at the time of re-engagement. This function requires a clutching device, most likely with friction plate elements, with its attendant system weight penalty. The aircraft designer will consider the safety benefit versus the weight penalty of catering for Flight Condition/Damage Scenario "7" in the matrix of possibilities outlined above, and decide whether the heavier, re-connectable couplings are warranted.

Drive System Configuration Issues; Maximum Safety Benefit From Disconnection. A study of the power flow from engines to rotors in FIGS. 1, 2 and 3 will indicate that the drive should have the most direct, minimum component, path from the engines to the rotors, and that the shaft disconnection element should isolate the maximum of interconnection gearboxes (usually the right-angle drive gearboxes), and the shaft, bearings and coupling components. This fact will fundamentally influence the drive and gear arrangement of the reduction set between the engine and the rotor. For maximum safety, and to gain the most benefit from shaft disconnection, drive schemes where the engine powers the cross-shaft by bevel gearing, for example, become invalid.

Applicability to Different Types of Lifting-Rotor Aircraft

There are three categories of rotorcraft that have the capability to sustain forward flight from the lift of conventional wings, yet can take off and land vertically. All have rotors or thrusters, wings and a drive system connecting the propulsion units to the rotors, yet vary in their configuration. The three categories are the Tilt Rotor Aircraft, the Tilt Wing Aircraft and the Compound Helicopter.

A tilt rotor is a fixed-wing aircraft with multiple rotors disposed symmetrically either side of aircraft center. With the rotor axes vertical the rotors are the sole providers of lift for hover or Vertical Take-Off and Landing (VTOL) and with the rotor axes tilted to the horizontal, they produce the thrust required for sustained wing-born flight. The most commonly-quoted example of a tilt-rotor is the Bell-Boeing V-22 military aircraft. A variant of the tilt rotor is when two pairs of wing/rotor assemblies are arranged in tandem fashion at each end of the fuselage, becoming a quad tilt rotor.

A tilt wing is a non-fixed wing aircraft, whereby the entire assembly of wing, rotors (usually four), including their nacelles and engines, can tilt about a horizontal, transverse axis of the aircraft. A flying example of the tilt wing was the LTV-Hiller-Ryan XC-142A of 1964. As before, but together with the wing itself, the rotor axes are positioned vertically for VTOL and horizontally for flight in airplane mode. The term conversion refers to the transitional phase of flight when lift is shared between the rotors and the wing. The conversion corridor is the term applied to the boundary limits to the physical values of vertical and horizontal velocity, aircraft or rotors pitch angle, and the proportionality between rotor and wing lift.

A compound helicopter is a wing-equipped helicopter which, in addition to its main rotor(s), is provided with a thrust-producing propeller. An example is the Lockheed "Cheyenne" of the late 1960's. Various arrangements are practical, including configurations with tandem rotors and two thrust propellers and configurations with tandem rotors which tilt at least one rotor to provide thrust in wing borne flight. The lift and thrust axes of a compound helicopter are non-tilting. The main rotor lift required for VTOL is reduced in mostly wing-born forward flight to a minimum-power, minimum-drag arrangement by means of blade pitch adjustment.

In FIG. 1 a tilt rotor aircraft 100 is depicted by showing only rotor blades 105, a single nacelle 110, and a wing 120. The basic elements of the complete nacelle 110 are the engine 111, the rotor 112, the reduction gearbox 113 and the connection at right-angle or miter gearbox 140 to the cross-wing driveshaft 130. As can be seen from the illustration, the drive orientation of the cross wing shaft 130 undergoes an angle change of approximately 90 degrees at right-angle or miter gearbox 140. Shaft disconnection can be accomplished at disconnection device 115, and this design also includes a rotor brake 116.

As discussed above, the disconnection device 115 can be any suitable device, including for example, dog clutches and friction clutches, and collapsible clutches. Selection and implementation of the device 115 is accordance with the disclosure herein is considered to be well within the scope of those of ordinary skill in the art.

Figure 2:
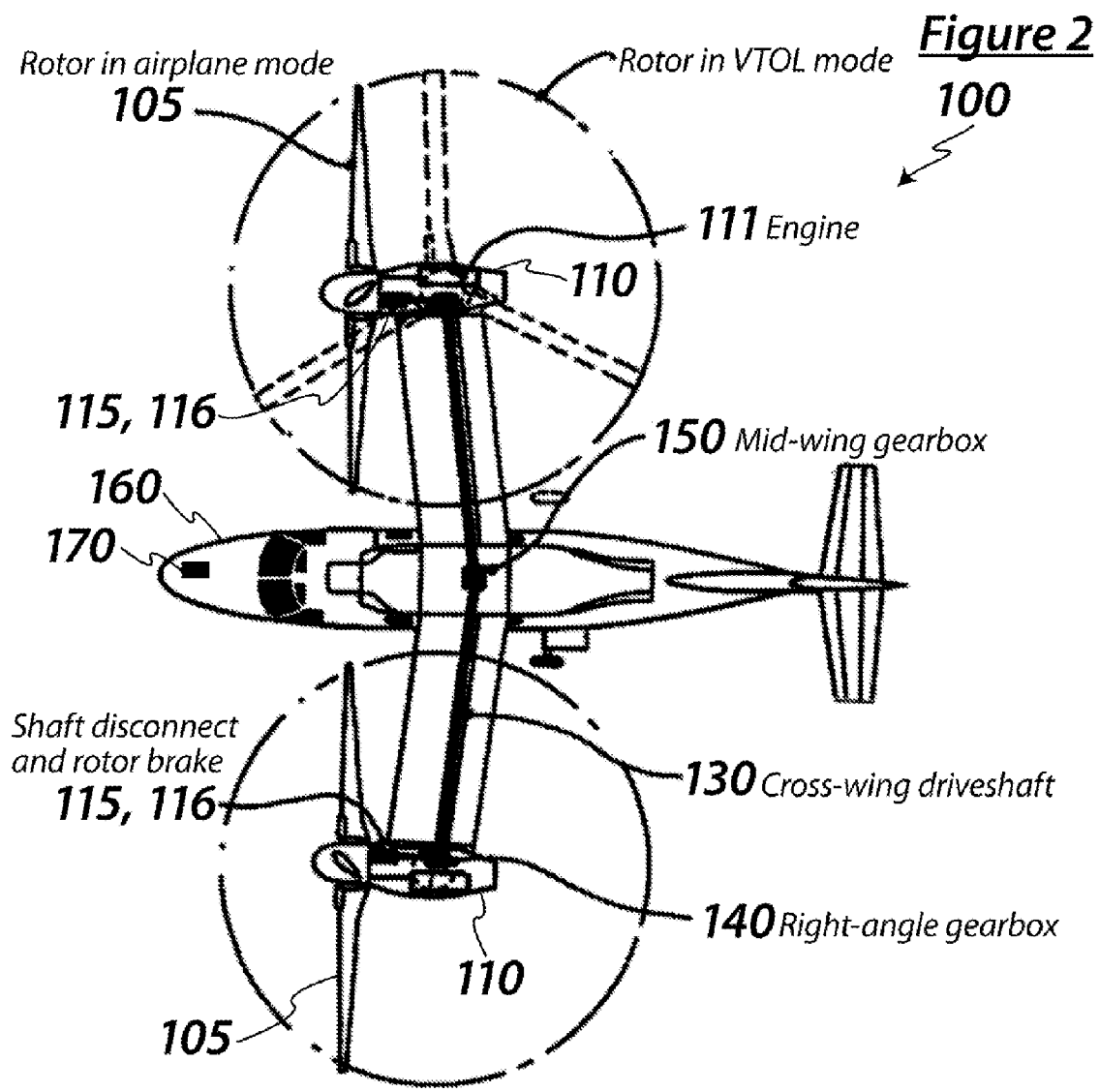
FIG. 2 is a schematic in plan view of a rotorcraft having left and right nacelles as in FIG. 1, and mechanically coupled left and right wing mounted proprotors.

In FIG. 2 a dual rotor tilt rotor rotorcraft 100 utilizes two nacelles 110 as described above but of opposite hand. The cross wing driveshaft 130 is shown, together with a mid-wing gearbox 150 that may be required to accept an angle change resulting from wing sweep and/or dihedral angles. The location of the shaft disconnection devices 115 is shown, and the rotor brakes 116 are also indicated. Rotors are shown as 105.

The disconnection device 115 should be viewed as being emblematic of all suitable devices, including specifically a dog clutch, a friction clutch, and a collapsible clutch.

In preferred embodiments the rotorcraft is either a tilt-rotor rotorcraft (exemplified by FIG. 2) or a tilt wing rotorcraft (not shown). In the latter case the tilting wing may be only that portion of the wing that is outboard of the nacelle. In other embodiments the rotorcraft may have a forward thrust device other than the rotors, and the rotorcraft can include a technology that provides for automatic conversion to wing-borne flight.

At an appropriate location, preferably within the fuselage 160, a control box 170 contains electronics that can be used to activate one or preferably both of the shaft disconnection devices 115 and one rotor brakes 116. The control box can be operated automatically or under some degree of operator control. Connections between the control box 170 and the disconnection devices 115/rotor brakes 116 are not shown as these are considered to be well within the understanding of the art, when viewed in conjunction with this disclosure. In yet another aspect, it is contemplated that the mechanical coupling between rotors can be reengaged during flight, presumably also under control of the control box 170.

In the case of a quad tilt rotor (not shown), four nacelles substantially as illustrated would be arranged in two tandem pairs of the same configuration.

Figure 3:
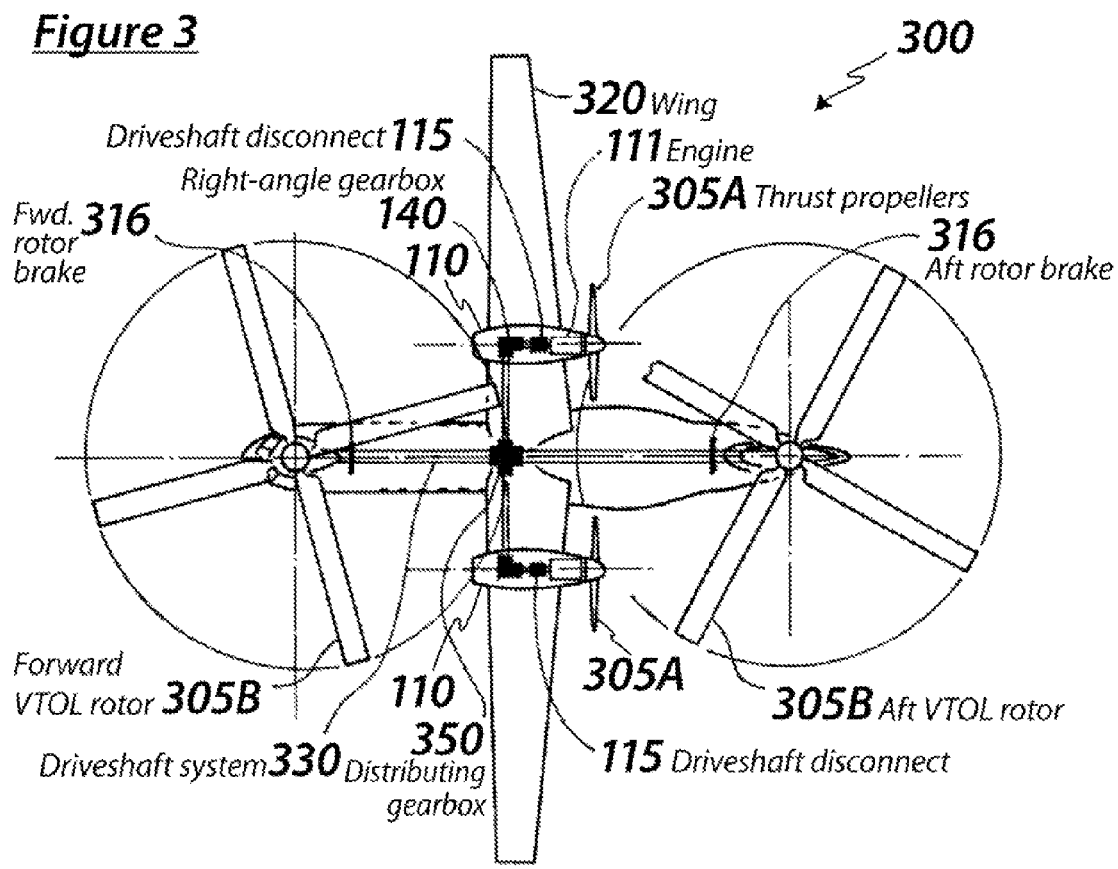
FIG. 3 is a schematic in plan view of a compound helicopter having left and right wing mounted propellers and forward and aft main lifting rotors, all mechanically coupled together.

In FIG. 3, a compound helicopter 300 has a thrust propeller 305A attached to each of the nacelles 110. The nacelles 110 include engines 111, driveshaft disconnects 115, right angle gearboxes 140, and the other components (not expressly shown) of the nacelles 110 as discussed with respect to FIG. 1. In addition, helicopter 300 has forward and aft lifting rotors 305B and 305A, which are mechanically coupled to the engines 111 of the nacelles 110 via the four-way driveshaft system 330 and a four-way distributing gearbox 350. Brakes 316 are disposed to operate upon the power train connecting the distributing gearbox 350 to the lifting rotors 305A and 305B.

Among many other benefits, designing, manufacturing, fitting, retrofitting or in some other manner providing an aircraft with a device that can disengage rotation of one of the rotors from that of another one of the rotors during flight can be used to improving survivability in an emergency situation.

Thus, specific embodiments, applications, and methods have been disclosed in which a mechanical coupling between rotors can be disengaged and optionally reengaged, during flight. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. In a lifting-rotor aircraft having first and second lifting rotors, each of which is normally powered during flight of the aircraft, first and second engines configured to power the lifting rotors, a wing that provides lift in forward flight and a mechanical link between the rotors, a method of accommodating a failure of the first rotor, comprising:

provide a device that can commandably de-couple a rotation of the first rotor from a rotation of the second rotor during flight of the aircraft;

automatically detecting the failure of the first rotor; and
automatically de-coupling the rotation of the first rotor from the rotation of the second rotor.

2. The method of claim 1, wherein the rotors are tilt rotors.

3. The method of claim 1, wherein the wing that provides lift in forward flight does not tilt, and further comprising the step of providing the aircraft with a second wings that tilts with the second rotors.

4. The method of claim 1, further comprising the step of providing the aircraft with a forward thrust device other than the rotors.

5. The method of claim 4, wherein the device comprises a dog clutch.

6. The method of claim 4, wherein the device comprises a friction clutch.

7. The method of claim 4, wherein the device comprises a collapsible clutch.

8. The method of claim 4, wherein the device is commandably operated to disengage the link.

9. The method of claim 1, further comprising the step of automatically converting the aircraft to wing-borne flight.

10. The method of claim 1, further comprising the step of reengaging the link during flight.

* * * * *